July 30, 1957 K. F. RENTSCHLER 2,800,802
GEAR RETARDING MECHANISM, ESPECIALLY FOR PHOTOGRAPHIC SHUTTERS
Filed Sept. 26, 1956
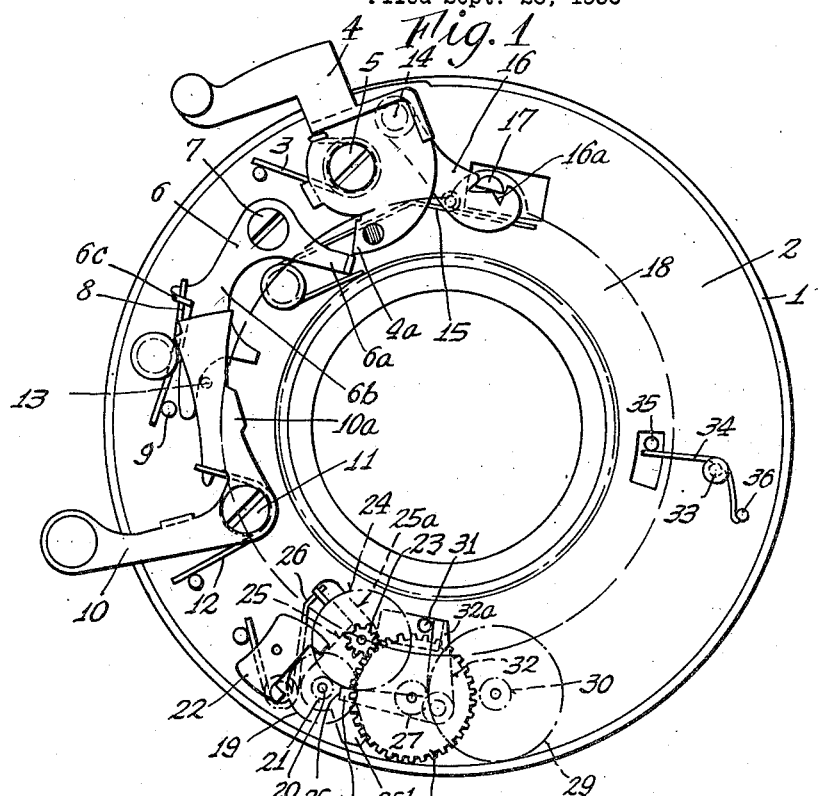
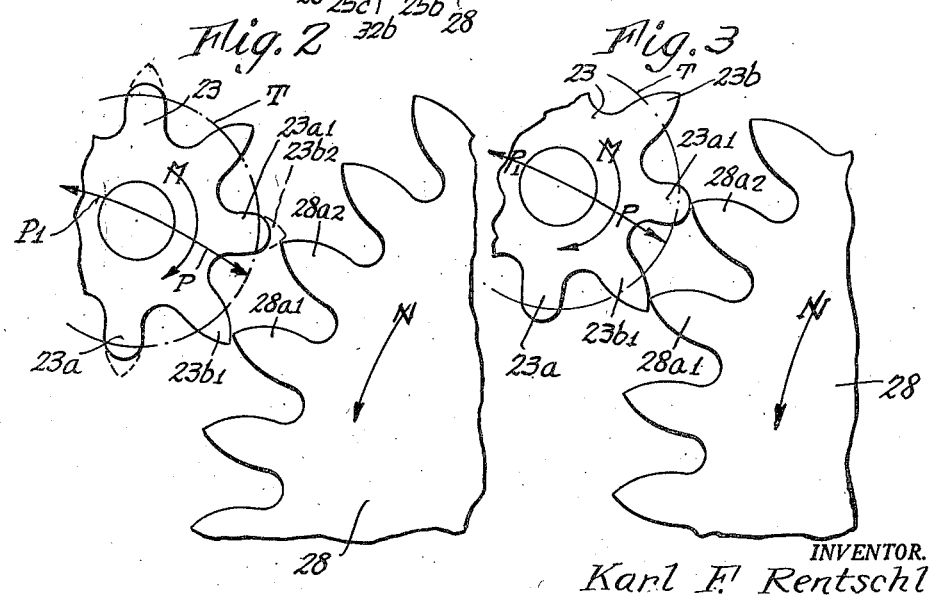
INVENTOR.
Karl F. Rentschler
BY
Munn, Liddy, Nathanson & March
ATTORNEYS

United States Patent Office 2,800,802
Patented July 30, 1957

2,800,802

GEAR RETARDING MECHANISM, ESPECIALLY FOR PHOTOGRAPHIC SHUTTERS

Karl F. Rentschler, Calmbach (Enz), Germany, assignor to Alfred Gauthier, G. m. b. H., Calmbach (Enz), Federal Republic of Germany, a corporation of the Federal Republic of Germany Application September 26, 1956, Serial No. 612,188

5 Claims. (Cl. 74—405)

This invention relates to the coupling together of gears, as employed especially in shutter mechanisms for cameras, and more particularly to retarding mechanisms employing gear groups or trains adapted to be engaged and disengaged from each other.

In the past, gear train retarding mechanism have been widely used in cameras for the reason that relatively large transmission ratios are obtainable, effecting widely different time delays, through the use of simple controlling operations. In connection with photographic shutters, such gear train time delay devices find a number of uses, for instance, as a means for obtaining different exposure times, or as a combined self-timer and synchronizer device for flash synchronization.

I have found that often, with such gear trains employing toothed components adapted to be coupled with and uncoupled from each other, the coupling procedure is not reliably completed due to the crests of two pairs of teeth becoming engaged and locked with each other, jamming the said components. When this occurs, the components cannot properly mesh and the gear train therefore fails to function in the intended manner. Therefore the operation of the shutter is impaired, and this may result in a misexposure, or the loss of a valuable picture.

The above drawback and disadvantage of gear train retarding means is obviated by the present invention, and one object of the invention is to provide a novel and improved, coupled-uncoupled type of time delay gear mechanism wherein the coupling operation is always effectively and completely carried out, and is not susceptible to blocking or jamming.

This is accomplished, in accordance with the invention, by providing on one of a pair of gears which is to be coupled and uncoupled, an even number of teeth, and by constructing the alternate teeth of said gear so that it has a lesser height than the remaining teeth.

In order to maintain the most advantageous sliding action of the meshing teeth, the alternate ones which are shortened are not made wider or extended at any point beyond the normal tooth outline, but instead are merely abbreviated at their tip or crest portions.

Where the gears which are to be coupled with each other both have an even number of teeth, it may be advantageous in the interest of economical production to alter or shorten the teeth on the gear having the smaller diameter, since a fewer total number of teeth need be so altered.

The shortened teeth may be advantageously rounded off at their extremities or crests, to further increase the reliability of the gear action.

Other features and advantages will hereinafter appear.

In the drawings accompanying this specification, similar characters of reference indicate corresponding parts wherever possible in the several views, in which:

Figure 1 is a front view of a photographic shutter structure, uncovered, incorporating a delayed-action device comprising groups of gear trains which are intended to be coupled and uncoupled. For the sake of clarity, the cocking and driving mechanism of the delayed action device has been omitted. The shutter is shown in released position, and the two gear train groups of the delayed action device are shown coupled to each other.

Figure 2 is an enlarged fragmentary view of the two gear members of the gear train, which are intended to be coupled with and uncoupled from each other, as constructed in accordance with the invention. In this figure there is a showing in broken outline, of normal-shaped teeth so positioned as to cause a jamming and blocking of the coupling operation.

Figure 3 is a view like Figure 2, but showing the gear components disposed closer to each other, such view illustrating the impossibility of jamming or blocking occurring with the improved gears of the present invention.

In Figure 1, the housing of an intra-lens shutter structure is indicated at 1, such housing having a base plate 2 provided with an axis 5 about which there is pivotally movable a cocking lever 4 biased by a drive spring 3. The cocking lever 4 has a nose 4a engageable with the short arm 6a of a well-known, two-armed locking lever 6 pivoted on a pivot screw 7. The locking lever 6 has a long arm 6b provided with a lug 6c engaged by one end of a spring 8 the other end of which engages an abutment pin 9 fixed to the base plate 2.

Release of the shutter is effected by a two-armed release lever 10 pivoting about a pivot screw 11 fixed to the base plate 2 and biased by a spring 12. The release lever 10 has an arm 10a carrying a pin 13 adapted to engage the long arm 6b of the locking lever 6, to effect release of the cocking lever 4 in the well known manner.

On the axis or pin 14 fixed to the cocking lever 4 there is pivotally mounted under the action of a spring 15 a latch member 16 having a notch 16a embracing a pin 17 fixed to the shutter blade ring 18. The ring 18 serves, in the well known manner, to actuate the known shutter blades which are not drawn for the sake of clarity.

Between two well-known bearing plates (not drawn for clarity) there are arranged the individual parts (shown in the lower portion of Figure 1) of a delayed action device comprising two groups of gear trains which are to be coupled with and uncoupled from each other. One group of the delayed action device comprises an anchor 22 cooperating with the anchor wheel 19 and also a gear wheel 24 meshing with the pinion 21 and rigidly connected with a second pinion 23. The gear 24 and pinion 23 are rotatably carried on an arm 25a of a shiftable lever 25 which pivots about the spindle 20 carrying the anchor wheel 19. The lever 25 is under the action of a spring 26 which tends to swing the lever in a clockwise direction.

The other group or gear train of the delayed action device consists of a gear 28 rigidly connected with a pinion 27, and a gear 29 meshing with the pinion 27 and rigidly connected to a pinion 30. This second group also includes a well known toothed segment, which is not drawn for the sake of clarity, and which engages and drives the pinion 30. The said toothed segment is driven in the well known manner by a helical expansion spring which is also not shown, and the delayed action device is held in cocked position by the usual locking means, which is also not drawn for the sake of clarity.

The shutter blade ring 18 fixedly carries a pin 31 which functions to keep disengaged the two groups of the delayed action device when the ring 18 is in its starting position. To accomplish this, the pin 31 engages one arm 32a of a bell crank 32 having a second arm 32b received in a recess or notch 25c of the lever 25. In the rest position of the shutter, the bell crank 32 is shifted by the pin 31 to such an extent that the lever 25 is swung counter-clockwise to completely disengage the pinion 32 from the gear wheel 28 and thereby uncouple the two groups of the delayed action device.

For the purpose of holding the shutter blade ring 18 in its starting position there is provided a stationary pin or stud 33 on the base plate 2, having a spring 34 engaging at one end a pin 35 on the ring 18, the other end of the spring 34 being anchored against a stationary pin 36 on the plate 2.

Upon release of the shutter, the bell crank 32 is released for counterclockwise movement by virtue of the right-to-left movement of the pin 31 as viewed in Figure 1. When this occurs, the spring 26 will shift the lever 25 counterclockwise, bringing the pinion 23 into engagement with the gear 28. This, then, effects the coupling of the two groups of the delayed action device. At the same time, the locking means for the delayed action device is actuated to release the latter for running down movement.

In accordance with this invention the two gears 23 and 28 of the groups of the delayed action device which are to be coupled together are constituted in a manner that at least one of them has an even number of teeth and has alternate teeth made shorter or lower in height than the normal height commonly utilized for such gearing.

In the embodiment of the invention illustrated herein both the pinion 23 and the gear 28 have even numbers of teeth. In the manufacture of gearing as provided by the invention there may be involved additional expense as concerns tooling and equipment to produce the gear. Accordingly, it is advantageous to apply the invention to the gear having the smaller number of teeth, inasmuch as this will require simpler tooling and involve a lower equipment cost. For this reason, the teeth which have the lower height or which are shorter, are provided on the pinion 23, which has only a total of eight teeth, and are not provided on the gear 28 having a total of thirty-two teeth. It will be readily understood, therefore, that only four of the pinion teeth need be made shorter, to carry out the invention, whereas sixteen of the teeth of the gear wheel 28 would have to be altered or shortened.

Figure 2 illustrates the manner in which the aforesaid undesired blocking or jamming of the teeth might occur when the gears 23 and 28 are brought together, with both gears having normal-shaped teeth. In this figure, the tooth 23b1 has a normal shape, whereas the teeth 23, 23a and 23a1 are shortened tooth or teeth of reduced height. In dotted outline there is shown, in connection with the shortened teeth 23, 23a and 23a1, the normal tooth outline, and one such dotted outline 23b2 is shown as being disposed for engagement with a tooth 23a2 of the gear 28. A normal tooth 23b1 is shown as engaged with a tooth 28a1 of the gear 28 whereby the said teeth straddle each other and prevent meshing of the gears and coupling of the gear trains or groups.

In Figure 3 there is illustrated the action which occurs when a long tooth and a shortened tooth of the pinion 23 attempt to straddle and block the teeth 28a1 and 28a2 of the gear 28. No interlocking occurs, but instead the teeth slide on each other and intermesh.

In Figures 2 and 3 the arrows marked N and M indicate the turning directions of the gear 28 and pinion 23 during the running down movement of the delayed action device. The arrow P indicates the direction of motion of the axis of the pinion 23 when moving in coupling direction, and the arrow P1 indicates the direction of motion of said axis when it is moving in the uncoupling direction.

As already mentioned, the pinion 23 is the gear which is provided with the shortened teeth, and such shortened teeth are shown in full outline, in Figures 2 and 3, whereas in Figure 2 the normal tooth shape is shown in broken outline, in connection with the shortened teeth.

Figure 2 illustrates a possible position of the pinion 23 and gear 28, such as might occur when coupling together the two groups of gear trains of the delayed action device. The sides of two neighboring teeth of the pinion 23, which are facing each other lie close to the sides or tips respectively of two neighboring teeth of the gear 28, such positioning being effected under the action of the spring 26 acting in the direction of the arrow P.

It will be understood that when this occurs the two gears 23 and 28 are jammed against each other and prevented from meshing, thus preventing a proper running down movement of the delayed action device. Turning of the pinion 23 is prevented because of the movement exerted by the driving tooth 28a1 of the gear 28 against the driven tooth 23b1 of the pinion 28 being removed, due to the engagement of the tooth 28a2 with the tooth 23b2.

Figure 3 illustrates the same relative positions of the teeth 23b1 and 28a1; however, the tooth 28b2 is now replaced by the tooth 23a1, and this latter tooth cannot lock against the upper edge, as viewed in Figure 3, of the tooth 28a2 as was the case in Figure 2.

Accordingly, with the tooth construction shown in Figures 2 and 3, wherein alternate teeth of the pinion 23 are rounded and shortened there is not possible a jamming or a blocking of the gears which heretofore rendered inoperative the delayed action device. It will be understood from Figure 3 that if the gear 28 is moved in the direction of the arrow N the tooth 28a1 is able to exert an effective driving force on the tooth 23b1, while the teeth 28a2 and 23a1 are sliding past each other at their crests. This sliding engagement of the crests of the two teeth mentioned may require that the axis of the pinion 23 shift slightly from right to left or in the direction of the arrow P1, to increase the distance between the axes of the gear 28 and pinion 23 the extent necessary to permit the teeth 23a1 and 28a2 to by pass each other. The tooth 28a2 exerts on the tooth 23a1 a pressure having a direction which is sloping with respect to the direction of the arrow P1 at an acute angle, thus effecting a slight shifting of the lever 25 in a counterclockwise direction.

By virtue of this mode of operation it is possible to obtain at all times a quick and complete meshing of the gears 23 and 28 and coupling of the two groups of the delayed action device.

The normal sliding action which is sought between the teeth of meshing gears may also be had with gears made in accordance with the present invention. For example, in the illustrated embodiment of the invention this is accomplished by providing the shortened teeth 23, 23a and 23a1 so that their outline does not fall outside of the outline of a normal tooth, and so that the modification and shortening of such teeth occurs mainly radially beyond the pitch line T. The best possible sliding action is obtained where the shortened teeth 23, 23a and 23a1 have the same shape as normal teeth in the vicinity of the pitch line T.

In the illustrated embodiment of the invention there is shown a coupling of gear trains of a delayed action device incorporated in a photographic intra-lens shutter. In this application, the gear train group which includes the anchor 22 is always disengaged from the other group powered by the driving spring when the shutter blades are in their closed position. By virtue of such gear trains being uncoupled, it is possible to obtain an especially easy cocking of the shutter drive mechanism, because there is only experienced the retarding action of a small portion of the entire delayed action device. Moreover, the gear train which includes the drive spring can be used in the well known manner as a synchronizer device for flash synchronization during such uncoupled condition, while when the two groups are coupled they may be used in connection with self-portraits and the like, since they provide for a running down time of about ten seconds.

In order to enable the gear train which includes the driving spring to be used as a synchronizer device, a setting ring may be arranged in a well known manner, such ring cooperating with the arm 25b of the lever 25 and always insuring disengagement of the two gear groups when it is in a certain position.

In the same manner as that illustrated above, in connection with the delayed action device, the invention may be applied to retarding mechanisms for obtaining various exposure times of photographic shutters, in which case the advantages described above will also be obtained for devices having a plurality of groups to be coupled. The possibility of coupling several gear groups in connection with such exposure-time retarding mechanisms may be utilized to obtain in a simple way various exposure times. In connection with such use it is readily possible to coordinate the individual exposure times with the mode of operation of the retarding mechanism so that with any setting a high degree of accuracy and consistency is obtained, since lost motion in the delay device will exert only insignificant influence if any, on the speeds obtained.

In addition, the invention has utility not only in connection with gear retarding mechanisms of photographic shutters, but also gear retarding mechanism of various other types, in other fields wherever it is desired to couple several gear trains or groups to each other with the utmost reliability.

Variations and modifications may be made within the scope of the claims, and portions of the improvements may be used without others.

I claim:

1. A gear retarding mechanism for use especially with photographic shutter structures, comprising a plurality of gear groups adapted to be coupled with each other, each of said groups having a toothed member intended to be brought into mesh with the member of the other group, one of said toothed members having alternate teeth shorter than the remaining teeth, thereby to prevent bridging and jamming of the teeth during relative movement of the members in tooth-meshing direction.

2. The invention as defined in claim 1 in which the toothed member having the shorter teeth is a wheel having an even number of teeth, one-half of said teeth being shortened.

3. The invention as defined in claim 1 in which the shape of the shortened teeth in the vicinity of the pitch circumference corresponds to the normal tooth shape.

4. The invention as defined in claim 1 in which the toothed members comprise gears of different diameters, both said gears having an even number of teeth, and in which the member having the shortened teeth has the smaller diameter.

5. The invention as defined in claim 1 in which the said shortened teeth have rounded-off ends.

No references cited.